US012797775B2

(12) United States Patent
Zhang et al.

(10) Patent No.: US 12,797,775 B2
(45) Date of Patent: Nov. 17, 2026

(54) DUAL-ENDED CARTRIDGE

(71) Applicant: Tianjin Yuanzhi Environmental Technology Co. Ltd., Tianjin (CN)

(72) Inventors: Kai Zhang, Tianjin (CN); Lin Lou, Tianjin (CN); Xin Guan, Tianjin (CN); Jingguan Du, Tianjin (CN)

(73) Assignee: Tianjin Yuanzhi Environmental Technology Co. Ltd., Tianjin (CN)

( * ) Notice: Subject to any disclaimer, the term of this patent is extended or adjusted under 35 U.S.C. 154(b) by 381 days.

(21) Appl. No.: 18/401,608

(22) Filed: Dec. 31, 2023

(65) Prior Publication Data

US 2025/0050248 A1 Feb. 13, 2025

(30) Foreign Application Priority Data

Aug. 11, 2023 (CN) ......................... 202330513666.7
Aug. 11, 2023 (CN) ......................... 202330513667.1
(Continued)

(51) Int. Cl.
*B01D 29/11* (2006.01)

(52) U.S. Cl.
CPC ...... *B01D 29/114* (2013.01); *B01D 2201/291* (2013.01); *B01D 2201/301* (2013.01); *B01D 2201/347* (2013.01)

(58) Field of Classification Search
None
See application file for complete search history.

(56) References Cited

U.S. PATENT DOCUMENTS 231,066 A 8/1880 Long
D335,535 S 5/1993 Arioka
(Continued)

FOREIGN PATENT DOCUMENTS

CN 107983005 A 5/2018
CN 207941270 U 10/2018
(Continued)

OTHER PUBLICATIONS

"Amazon.com_ Homall everydrop by Whirlpool Ice and Water Refrigerator Filter 1, EDR1RXD1, Single-Pack , Purple Appliances" Downloaded Dec. 31, 2023, 8 Pages, https://www.amazon.com/EveryDrop-Whirlpool-Refrigerator-Water-Filter/dp/B00UXG4WR8/ref=sr_1_3?crid=2MN1OFDWSOJ1K&keywords=whirlpool+water+filter+1&qid=1697041155&rdc=1&sprefix=whir%2Caps%2C73&sr=8-3.
(Continued)

*Primary Examiner* — Krishnan S Menon
(74) *Attorney, Agent, or Firm* — MEI & MARK LLP

(57) ABSTRACT

A water filter cartridge comprises a main body comprising a centered major axis, an attachment end, an outer surface, and a cap end. An inlet boss, a locating lug, and a core cutout are offset on the attachment end from the centered major axis. The outer surface comprises a first front pair of positioning features configured as L-shaped flanges. A second front pair of positioning features are configured as guide blocks and are axially aligned with the first front pair of positioning features. A core assembly is inserted through the main body and comprises a filter core configured to direct filtered water towards an outlet boss. An end cap is connected to the cap end. Optionally, the end cap comprises a third front positioning feature configured as an L-shaped flange. The third front positioning feature is axially aligned with the second pair of front positioning features.

18 Claims, 10 Drawing Sheets

(30) Foreign Application Priority Data

Oct. 25, 2023 (CN) ......................... 202311388865.5
Oct. 25, 2023 (CN) ......................... 202322865339.5

(56) References Cited

U.S. PATENT DOCUMENTS

| | | | |
|---|---|---|---|
| D494,654 | S | 8/2004 | Macaulay |
| 7,000,894 | B2 | 2/2006 | Olson et al. |
| 7,147,773 | B2 | 12/2006 | Mitchell et al. |
| 7,610,932 | B2 | 11/2009 | Olson et al. |
| D731,616 | S | 6/2015 | Zou |
| D752,179 | S | 3/2016 | Lu |
| D759,789 | S | 6/2016 | Baird |
| D760,868 | S | 7/2016 | Lu |
| D762,813 | S | 8/2016 | Lu |
| D764,021 | S | 8/2016 | Lu |
| D764,626 | S | 8/2016 | Lu |
| D773,607 | S | 12/2016 | Lu |
| D774,623 | S | 12/2016 | Lu |
| D784,492 | S | 4/2017 | Lu |
| D788,880 | S | 6/2017 | Zou |
| D794,749 | S | 8/2017 | Zou |
| D794,750 | S | 8/2017 | Zou |
| D794,751 | S | 8/2017 | Zou |
| D798,998 | S | 10/2017 | Zou |
| D803,349 | S | 11/2017 | Zou |
| D806,831 | S | 1/2018 | Zou |
| D807,474 | S | 1/2018 | Zou |
| D820,386 | S | 6/2018 | Campbell |
| D820,387 | S | 6/2018 | Campbell |
| D822,155 | S | 7/2018 | Zou |
| D824,484 | S | 7/2018 | Zou |
| D827,767 | S | 9/2018 | Lu |
| D831,154 | S | 10/2018 | Campbell |
| D831,155 | S | 10/2018 | Campbell |
| D831,156 | S | 10/2018 | Campbell |
| D831,786 | S | 10/2018 | Zou |
| D831,788 | S | 10/2018 | Zou |
| D845,433 | S | 4/2019 | Zou |
| D845,434 | S | 4/2019 | Zou |
| D846,069 | S | 4/2019 | Zou |
| D846,070 | S | 4/2019 | Zou |
| D846,693 | S | 4/2019 | Zou |
| 10,272,369 | B2 | 4/2019 | Zhibin |
| D854,121 | S | 7/2019 | Zou |
| 10,357,727 | B2 | 7/2019 | Zhibin |
| D856,472 | S | 8/2019 | Zou |
| D856,473 | S | 8/2019 | Zou |
| D856,474 | S | 8/2019 | Zou |
| D857,157 | S | 8/2019 | Zou |
| D857,158 | S | 8/2019 | Zou |
| D858,691 | S | 9/2019 | Zou |
| D858,692 | S | 9/2019 | Zou |
| D858,693 | S | 9/2019 | Zou |
| D858,694 | S | 9/2019 | Zou |
| D863,500 | S | 10/2019 | Zou |
| D869,892 | S | 12/2019 | Zou |
| D871,820 | S | 1/2020 | Zou |
| 10,525,387 | B2 | 1/2020 | Campbell |
| D875,209 | S | 2/2020 | Zou |
| D878,517 | S | 3/2020 | Zou |
| 10,584,040 | B2 | 3/2020 | Campbell |
| D883,427 | S | 5/2020 | Zou |
| D883,428 | S | 5/2020 | Zou |
| D883,429 | S | 5/2020 | Zou |
| D883,430 | S | 5/2020 | Zou |
| D885,833 | S | 6/2020 | Zou |
| D886,940 | S | 6/2020 | Zou |
| D886,941 | S | 6/2020 | Zou |
| D891,168 | S | 7/2020 | Zou |
| D891,577 | S | 7/2020 | Zou |
| D892,264 | S | 8/2020 | Zou |
| D892,265 | S | 8/2020 | Zou |
| D892,266 | S | 8/2020 | Zou |
| D892,973 | S | 8/2020 | Zou |
| D894,327 | S | 8/2020 | Zou |
| D895,061 | S | 9/2020 | Zou |
| D896,341 | S | 9/2020 | Zou |
| D899,838 | S | 10/2020 | Zou |
| 10,967,313 | B2 | 4/2021 | Campbell |
| 11,008,225 | B2 | 5/2021 | Zou |
| 11,027,228 | B1 | 6/2021 | Zou |
| D939,044 | S | 12/2021 | Liqin |
| D948,659 | S | 4/2022 | Mccollough |
| D948,661 | S | 4/2022 | Zou |
| D950,010 | S | 4/2022 | Zou |
| 11,382,441 | B2 | 7/2022 | Zou |
| D961,042 | S | 8/2022 | Zou |
| D961,979 | S | 8/2022 | Zou |
| D966,462 | S | 10/2022 | Zou |
| D968,557 | S | 11/2022 | Zou |
| D968,558 | S | 11/2022 | Zou |
| D973,837 | S | 12/2022 | Zou |
| D1,056,125 | S | 12/2024 | Romandy |
| D1,058,790 | S | 1/2025 | Zou |
| D1,059,542 | S | 1/2025 | Cooper |
| 2004/0211717 | A1 | 10/2004 | Mitchell |
| 2010/0170841 | A1 | 7/2010 | An |
| 2015/0258476 | A1 | 9/2015 | Boyce et al. |
| 2016/0304359 | A1 | 10/2016 | Cur |
| 2018/0001237 | A1 | 1/2018 | Zhibin |
| 2018/0001241 | A1 | 1/2018 | Zhibin |
| 2018/0221794 | A1 | 8/2018 | Zhibin |
| 2018/0290083 | A1 | 10/2018 | Campbell |
| 2019/0106333 | A1 | 4/2019 | Campbell |
| 2020/0337486 | A1 | 10/2020 | Zou |
| 2020/0392015 | A1 | 12/2020 | Zou |
| 2021/0107805 | A1 | 4/2021 | Zhibin |
| 2024/0001266 | A1 | 1/2024 | Qui |
| 2024/0238707 | A1 | 7/2024 | Zou |

FOREIGN PATENT DOCUMENTS

| | | |
|---|---|---|
| CN | 308485730 | 8/2023 |
| CN | 308485729 | 2/2024 |

OTHER PUBLICATIONS

"Amazon.com_ Everydrop by Whirlpool Ice and Water Refrigerator Filter 3, EDR3RXD1, Single-Pack _ Appliances" Downloaded Dec. 31, 2023, 10 Pages, https://www.amazon.com/Whirlpool-EDR3RXD1-Everydrop-Refrigerator-Filter/dp/B00UB441HS/ref=sr_1_5?crid=2XGOZBUUJZP9R&keywords=whirlpool+water+filter&qid=1697041212&rdc=1&sprefix=whirlpool+water+filter%2Caps%2C74&sr=8-5.

Kai Zhang et al., Pending U.S. Appl. No. 29/923,714, filed Dec. 31, 2023, 11 pages.

Kai Zhang et al., Pending U.S. Appl. No. 29/923,713, filed Dec. 31, 2023, 11 pages.

"NPL.Eyedrop" Sep. 14, 2014, Amazon.com, site visited Feb. 18, 2025: https://amazon.com/Homall-everydrop-Regriderator-EDR1RXD1-Single-Pack/dp/B00UXG4WR8?ref_=ast_sto_dp (Year: 2014).

"NPL.Pippipa" Nov. 22, 2022, Amazon.com, site visited Feb. 8, 2025: https://amazon.com/dp/B0CLHTYHS3/ref=sspa_dk_detail_13?pf_\ (Year:2022).

https://www.amazon.com/ICEPURE-Replacement-Everydrop%C2%AE-EDR3RXD1-Refrigerator/dp/B0CPFK92KF/ref=sr (Year: 2023).

"NPL.Marriotto" Feb. 8, 2021, Amazon.com, site visited Feb. 18, 2025: https://www.amazon.com/MARRIOTTO-Refrigerator-Compatible-EDR3RXD1-Packaging/dp/B08W52FT6R/ref=sr (Year: 2021).

Office Action for Chinese Application 202311388865.5 mailed Jan. 28, 2026, 7 pages.

DUAL-ENDED CARTRIDGE

PRIORITY

This application claims the benefit of priority to Chinese Invention patent application No. 202311388865.5 filed Oct. 25, 2023, Chinese Utility Model application No. 202322865339.5 filed Oct. 25, 2023, Chinese Design patent application No. 202330513667.1 filed Aug. 11, 2023, and Chinese Design patent application No. 202330513666.7 filed Aug. 11, 2023, all of which are incorporated by reference in their entirety.

FIELD

This application relates to water filter cartridges for appliances such as refrigerators. One end of the cartridge comprises two bosses on a main body. The water inlet boss and the water outlet boss are separated.

BACKGROUND

Refrigerator water filters are currently subject to cross-contamination from pre-filtered and filtered water. This may be due to the overlapping of the inlet and outlet ports at the same axial location. One or more seals in an axial location should separate prefiltered and filtered water, but tracking down cross-contamination and remediating internal leak points can be difficult. The filtration efficiency of the overlapping inlet and outlet ports is thus low.

SUMMARY

A water filter cartridge is shown to comprise separate axial locations for the inlet boss and the outlet boss. The inlet boss can be configured to connect to a water line or other coupling for supplying unfiltered water to the water filter cartridge. The outlet boss can be configured to connect to a water line or other coupling for receiving the filtered water expelled from the water filter cartridge. Other expressions for a boss include "head" or "end." So, it is convenient to alternatively refer to the water filter cartridge as a dual-ended cartridge or dual-head cartridge.

The inlet boss and the outlet boss are connected to corresponding cavities inside the water filter cartridge to avoid cross-contamination of pre-filtered water and filtered water. It is possible to locate the inlet boss and the outlet boss so that one is centered on the filter body and the other is offset to a side of the filter body. Then, the problem of discovering the internal leakage location in the coaxial scenario is avoided and the filtration efficiency is improved.

When using a separated inlet boss and outlet boss, alignment of the water filter cartridge is needed to ensure that the flow paths are correctly used. So, the disclosed water filter cartridge overcomes the above disadvantages and improves the art by providing alignment features selected among locating lugs and various positioning features.

A water filter cartridge comprises a main body comprising a major axis, a plane bisecting the main body and including the major axis, an attachment end, an outer surface, and a cap end. The attachment end comprises an inlet boss, a locating lug, and a core cutout. The outer surface comprises a first front pair of positioning features configured as L-shaped flanges and aligned radially about the major axis, and a second front pair of positioning features configured as guide blocks aligned radially about the major axis. The plane passes between the first front pair of positioning features and the second front pair of positioning features. A core assembly is inserted through the main body. The core assembly comprises a filter core configured to direct filtered water towards an outlet boss, and the outlet boss is positioned to protrude away from the core cutout. An end cap is connected to the cap end.

As an alternative, a water filter cartridge comprises a main body comprising a centered major axis, an attachment end, an outer surface, and a cap end. The attachment end comprises an inlet boss offset from the centered major axis, a locating lug offset from the centered major axis, and a core cutout offset from the centered major axis. The outer surface comprises a first front pair of positioning features configured as L-shaped flanges and aligned radially about the centered major axis. A second front pair of positioning features are configured as guide blocks and are axially aligned with the first front pair of positioning features. A core assembly is inserted through the main body. The core assembly comprises a filter core configured to direct filtered water towards an outlet boss, and the outlet boss is positioned to protrude away from the core cutout. An end cap is connected to the cap end. The end cap comprises a third front positioning feature configured as an L-shaped flange. The third front positioning feature is axially aligned with the second pair of front positioning features.

Additional objects and advantages will be set forth in part in the description which follows, and in part will be obvious from the description, or may be learned by practice of the disclosure. The objects and advantages will also be realized and attained by means of the elements and combinations particularly pointed out in the appended claims.

DETAILED DESCRIPTION

Figure 1A:
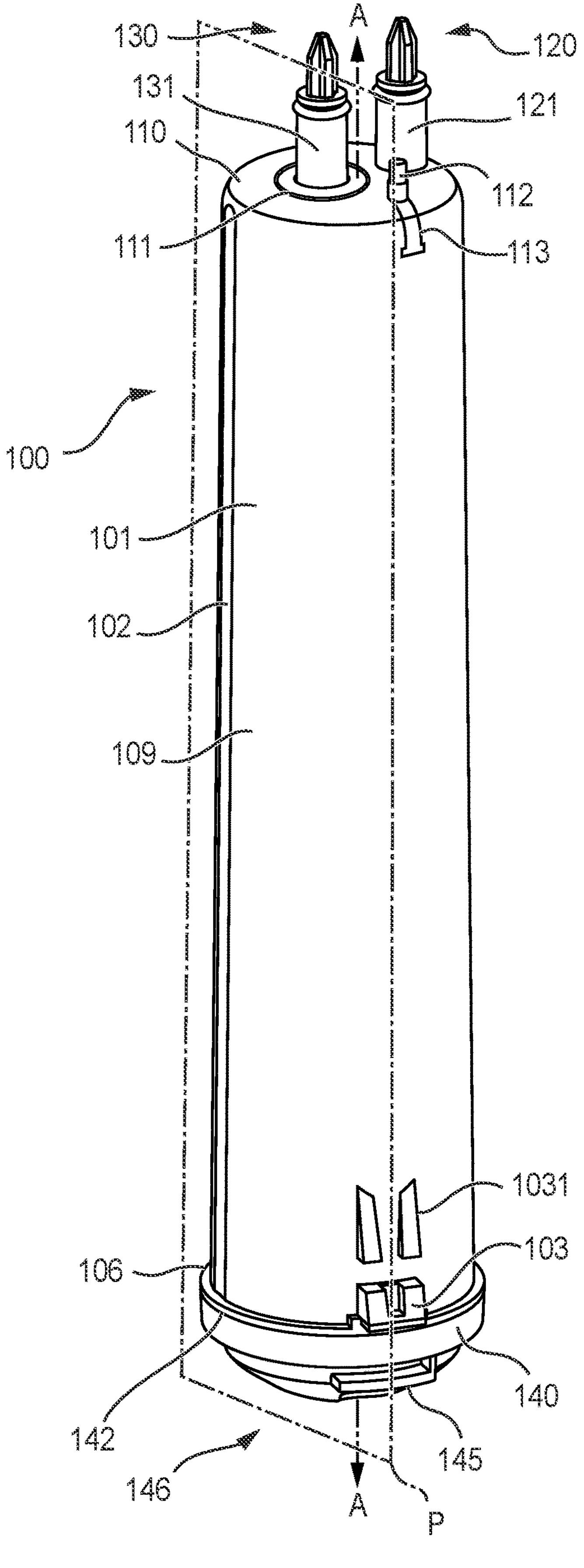
FIGS. 1A & 1B are perspective exterior views of a first example dual-ended water filter cartridge.

A water filter cartridge 100, 200 comprises a main body 101, 201 comprising a major axis A, B, a plane P, Q bisecting the main body 101 and including the major axis A, B. Main body 101 includes an attachment end 110, 210, an outer surface 109, 209, optional outer grooves 102, 202, and a cap end 105, 205. The attachment end 110, 210 comprises an inlet boss 120, 220, a locating lug 112, 212, and a core cutout 111, 211. The outer surface 109, 209 comprises a first front pair of positioning features 103, 203 configured as L-shaped flanges and aligned radially about the major axis A, B, and a second front pair of positioning features 1031, 2031 configured as guide blocks aligned radially about the major axis A, B. The plane P, Q passes between the first front pair of positioning features 103, 203 and the second front pair of positioning features 1031, 2031. A core assembly 150, 250 is inserted through the main body 101, 201. The core assembly 150, 250 comprises a filter core 180, 280 configured to direct filtered water towards an outlet boss 130, 230, and the outlet boss 130, 230 is positioned to protrude away from the core cutout 111, 211. An end cap 140, 240 is connected to the cap end 105, 205.

As illustrated, the main body 101, 201 is configured as a columnar structure that can receive a core assembly 150, 250. The core assembly 150, 250 can be inserted within the main body 101, 201 and the cap end 105, 205 can receive the end cap 140, 240 to enclose the core assembly 150, 250 in the main body 101, 201.

Alternative end caps 140, 240 include features that can be optional or alternative on the water filter cartridges 100, 200. Interchangeable options for the end cap 140, 240 can include alignment or enclosure features. The end cap 140, 240 can be pressed to the main body 101, 201 with or without additional fixatives like welding, adhesives, or sealants. As one option, an outer seat 141 on an outer rim 141 can abut a cap step 106 on the cap end 105. Additional positioning tabs, lugs, or patterns can be included with the cap step 106. End cap 140, 240 can comprise optional positioning labels or graphics. Another option can configure an outer rim 142 and an inner rim 143 to form a junction groove 107 therebetween, and the cap end 105 can engage with or seat in the junction groove 107. Or, end cap 240 can include the outer seat 241 on the outer rim 242 without an inner rim, and the cap end 205 can abut the outer rim 242. Also, alternative arrangements of inner guide plates 144, 244 are shown within the cap cavity 147, 247. On the exterior, various shapes can be formed on an embossed end 146, 246 and the shapes can aid in the visual appeal of the water filter cartridge 100, 200, even if a secondary function like grip or alignment is achieved via the non-exhaustive illustrations comprising flower-petal or linear options. The embossed end 146, 246 is not limited to the illustrated shapes and can include other patterns of more or less visual complexity. As yet another option, end cap 140 is shown with cap positioning features 145, 149 also called herein third front positioning feature 145 and rear positioning feature 149. The pair of cap positioning features 145, 149 are illustrated as L-shaped flanges. The incorporated by reference Chinese priority applications include additional examples of ornamentation that can be applied to a water filter cartridge while having dual-ends, as claimed.

When included, inner rim 143 of end cap 140 can abut a bottom shoulder 192 of a bottom cover 190 so that bottom cover 190 divides the cap cavity 147 from an outer cavity 10. Or, bottom shoulder 292 can extend in a portion of an outer cavity 11. Bottom cover 190 can include bottom standoffs 195, 295 or brackets extending from a bottom plate 191, 291. The bottom standoffs 195, 295 can cooperate with footings or other base portions such as the inner guide plates 144, 244 to restrict or direct water flow in the water filter cartridge 100, 200. A bottom chute 193, 293 can extend from the bottom plate 191, 291 in parallel to the bottom shoulder 192, 292. Optionally, bottom ridges 196 can be formed between the bottom shoulder 192 and the bottom chute 193. The bottom end 185 of a filter core 180 can fixed to the bottom ridges 196. Fixation can be accomplished herein by a fixing agent such as a soldering or welding technique or a bonding material such as a sealing paste, adhesive, or cured material among other options. Or, a bottom end 285 of a filter core 280 can abut the bottom plate 291 directly or be adhered directly to the bottom plate 291. In either case, bottom chute 193, 293 can protrude into an inner cylinder 183, 283 of filter core 180, 280, with or without the above-mentioned adhesive included. A positioning effect can be achieved with the filter core 180, 280.

Filter core 180, 280 can comprise a block or a packaged filter media, such as activated carbon, catalytic carbon, fluxion, birm, osmotic membrane, activated aluminum, calcite, manganese dioxide, combinations thereof, among other options. Filter core 180, 280 comprises a core body 181, 281 having an outer surface 182, 282 and an inner cylinder 183, 283. The bottom end 185, 285 is installed against the bottom cover 190, 290 and the outlet end 184, 284 is installed against a diversion cover 170, 270. Pre-filtered water can enter the inlet boss 120, 220 to inlet cavity 118, 218 and can flow in outer cavity 10, 11, then traverse the core body 181, 281 to become filtered water in inner cavity 20, 21. The filtered water can traverse the inner cylinder 183, 283 towards outlet cavity 162, 262 and outlet boss 130, 230.

Diversion cover 170, 270 can abut or be adjacent to the outlet end 184, 284 and can achieve a positioning effect with the filter core 180, 280. A diversion plate 171, 271 can comprise a diversion chute 175, 275 with a central pass-through. This can be unlike the bottom cover 190, 290 bottom chute 193, 293, which can be formed as a solid bottom plate 191, 291 without a central pass-through. As an option, the diversion chute 175, 275 can abut or be fixed to the inner cylinder 183, 283 of the filter core 180, 280, while the outlet end 184, 284 of the filter core 180, 280 can abut or be fixed to the diversion plate 171, 271, with or without ribs formed on the diversion plate 171, 271. A fixative from above can be used.

Diversion cover 170, 270 can be seated in a core cover 160, 260. An outlet plate 163, 263 can be bounded by a core shoulder 161, 262 that seats on the diversion shoulder 172, 272. Diversion standoffs 176, 276 can be used for a purpose such as spacing the outlet plate 163, 263 from the diversion plate 171, 271 or another purpose such as directing filtered water flow towards an outlet cavity 162, 262 in an outlet neck 164. 264. Outlet neck 164, 264 can seat in the core abutment 117, 217 that extends as part of the core cutout 111, 211 in the attachment end 110, 210. A step-down from the outlet cavity 162, 262 to the outlet port 167, 267 in outlet shaft 131, 231 can lead filtered water out of the water filter cartridge 100, 200.

Figure 3A:
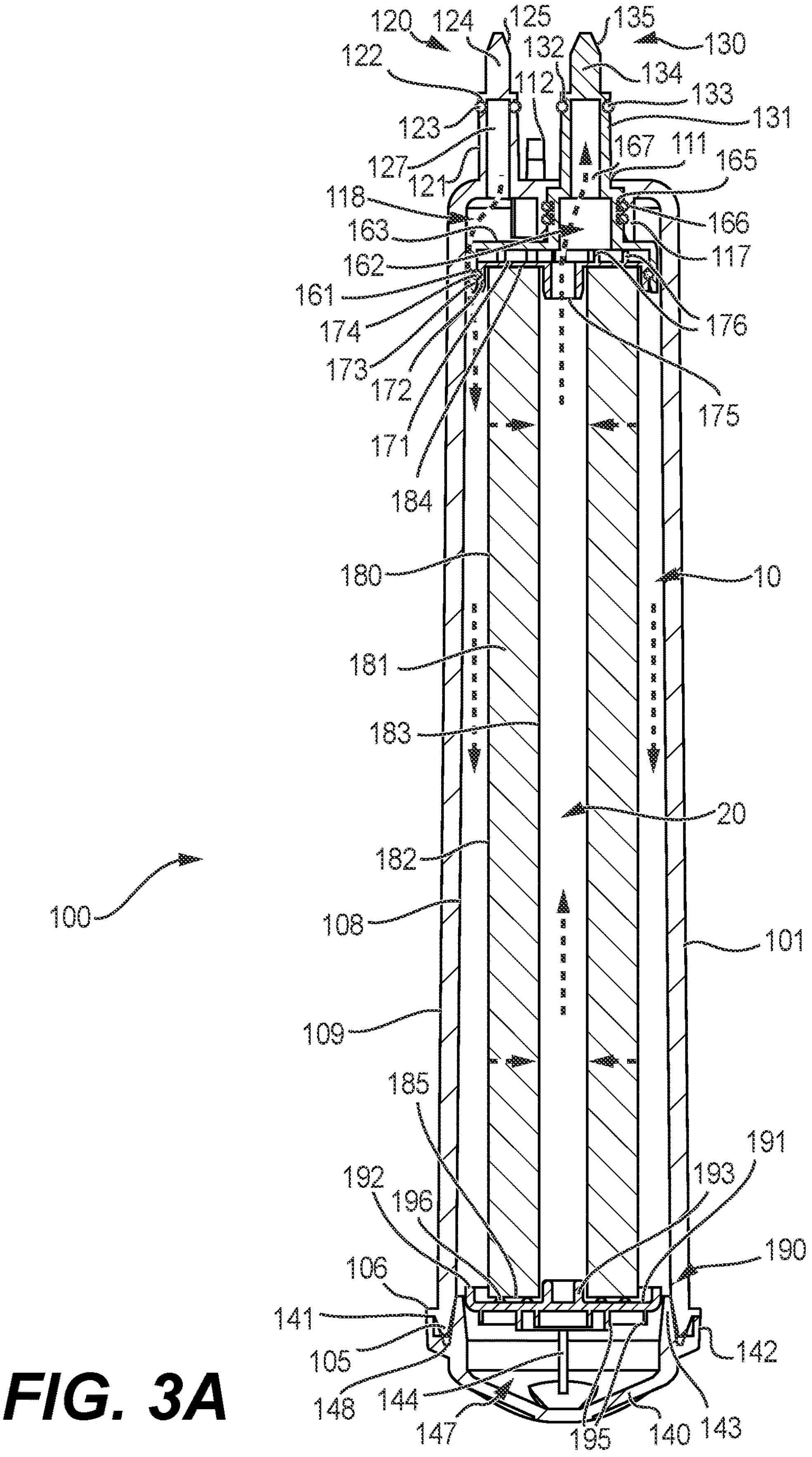
FIGS. 3A & 3B are cross section views of the first and second example dual-ended water filter cartridges.
Figure 3B:
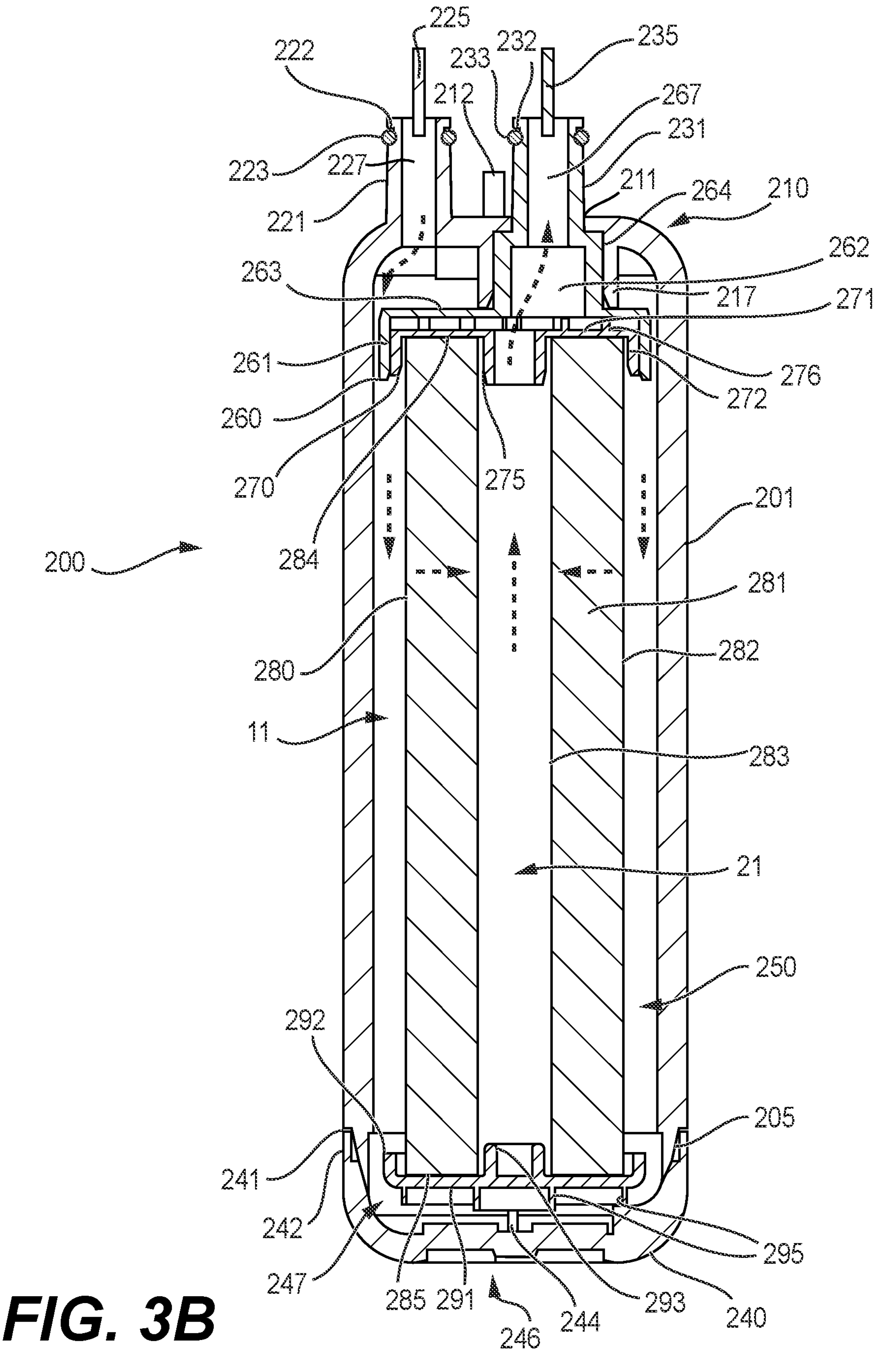
Figure 4:
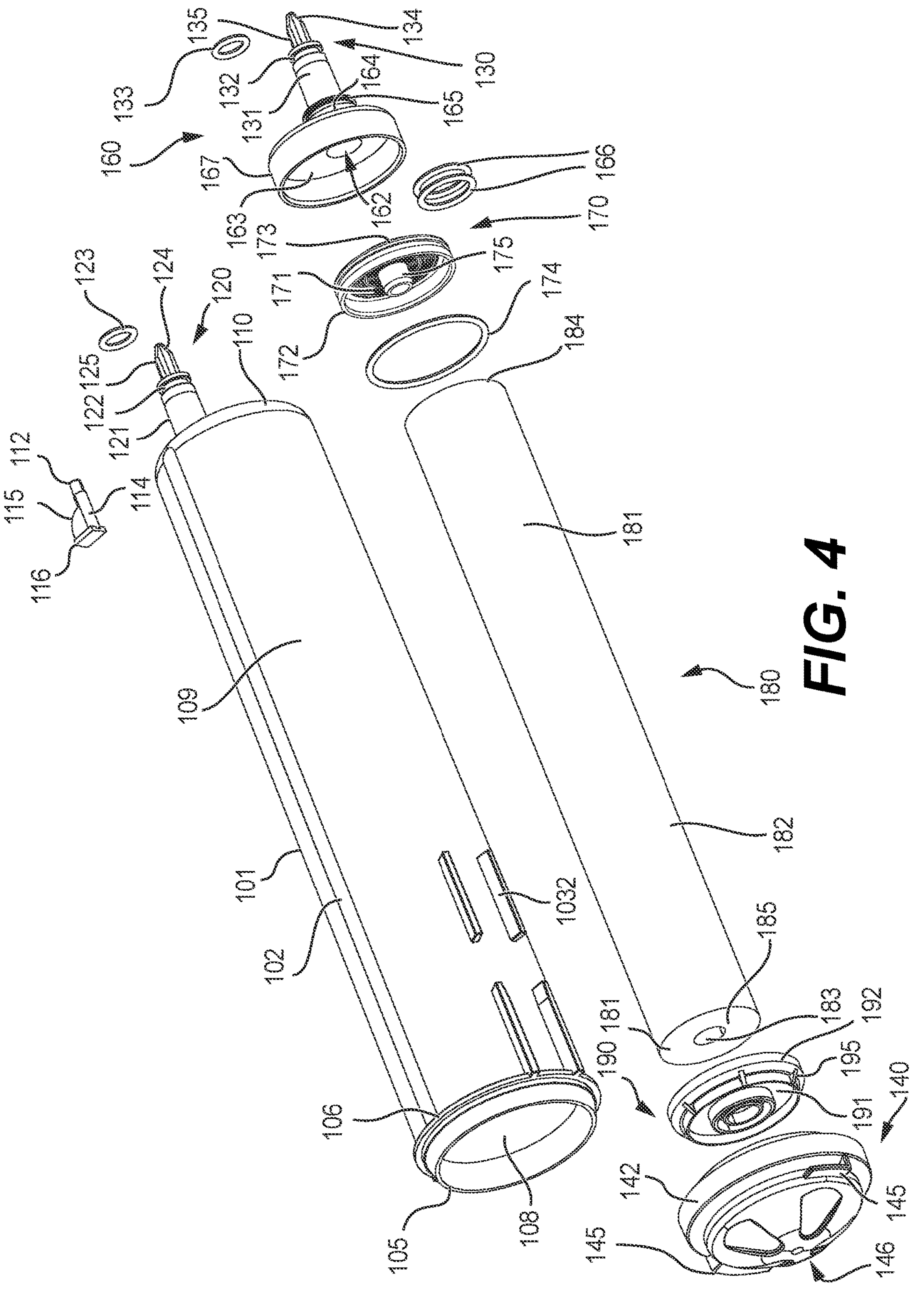
FIG. 4 is an exploded view of the first example dual-ended water filter cartridge.
Figure 5:
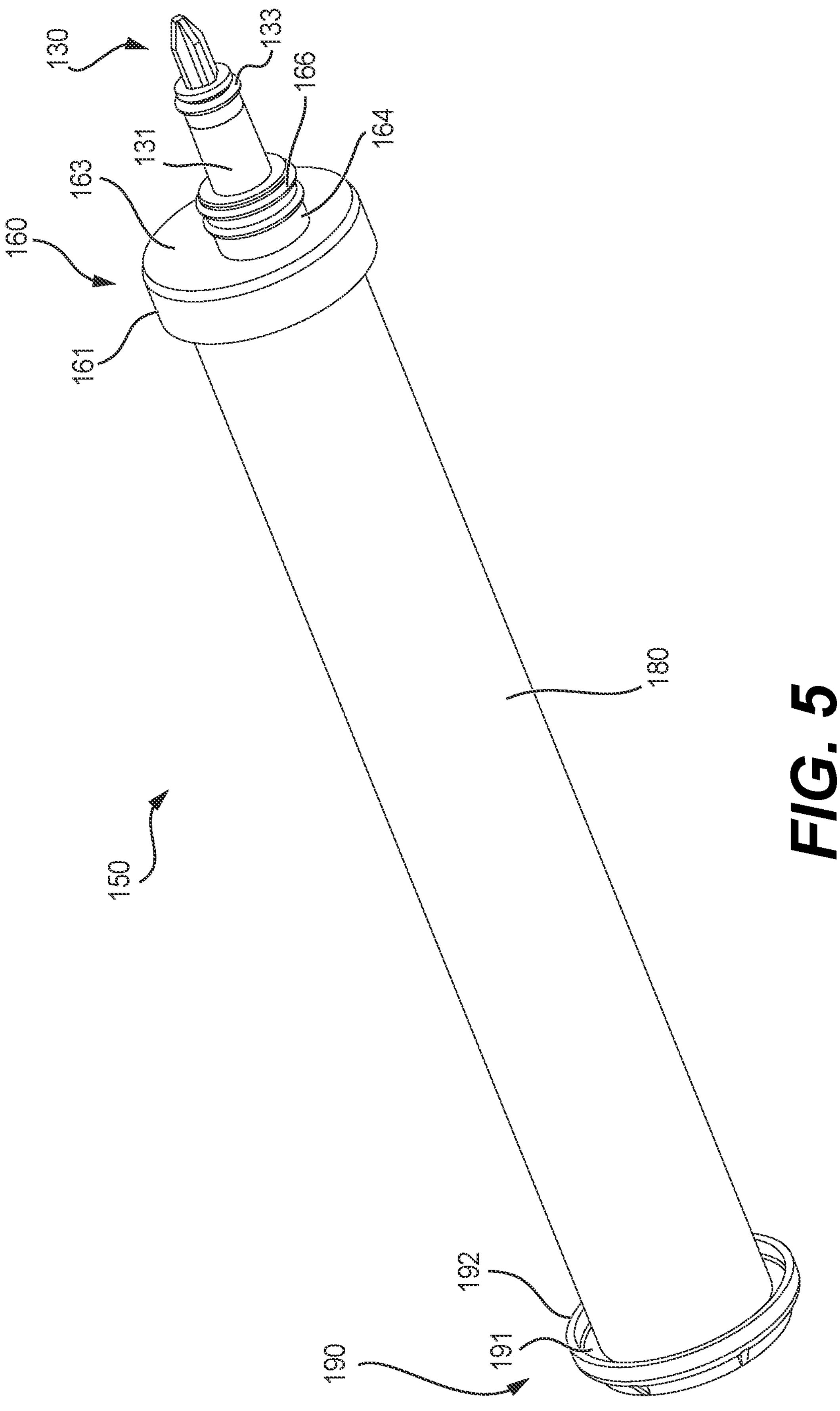
FIG. 5 is a view of a core assembly.
Figure 6:
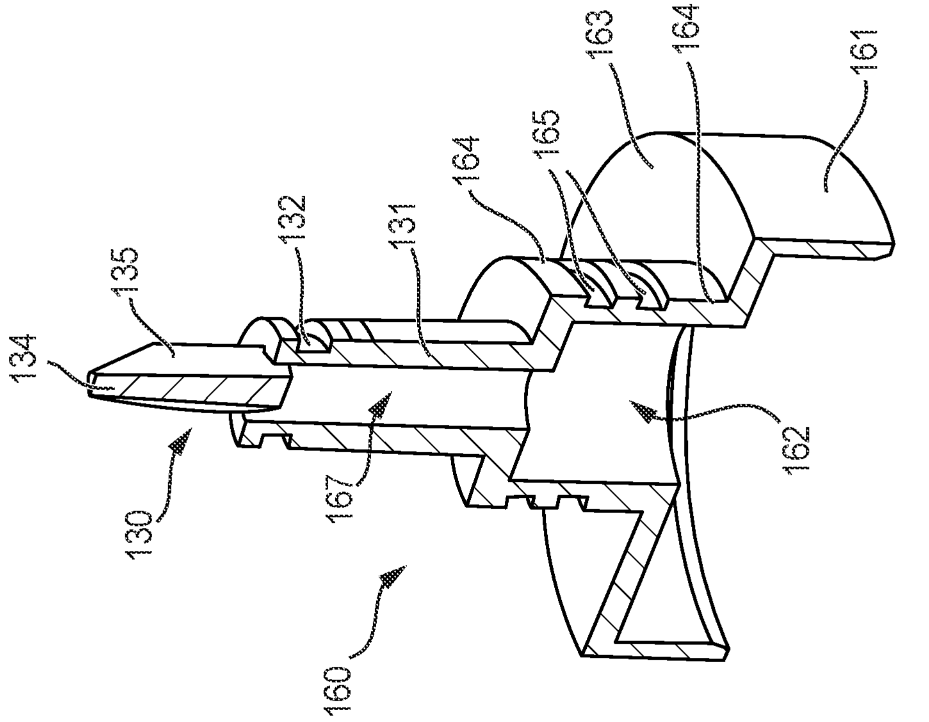
FIG. 6 is a cross-section view of a core cover.
Figure 7:
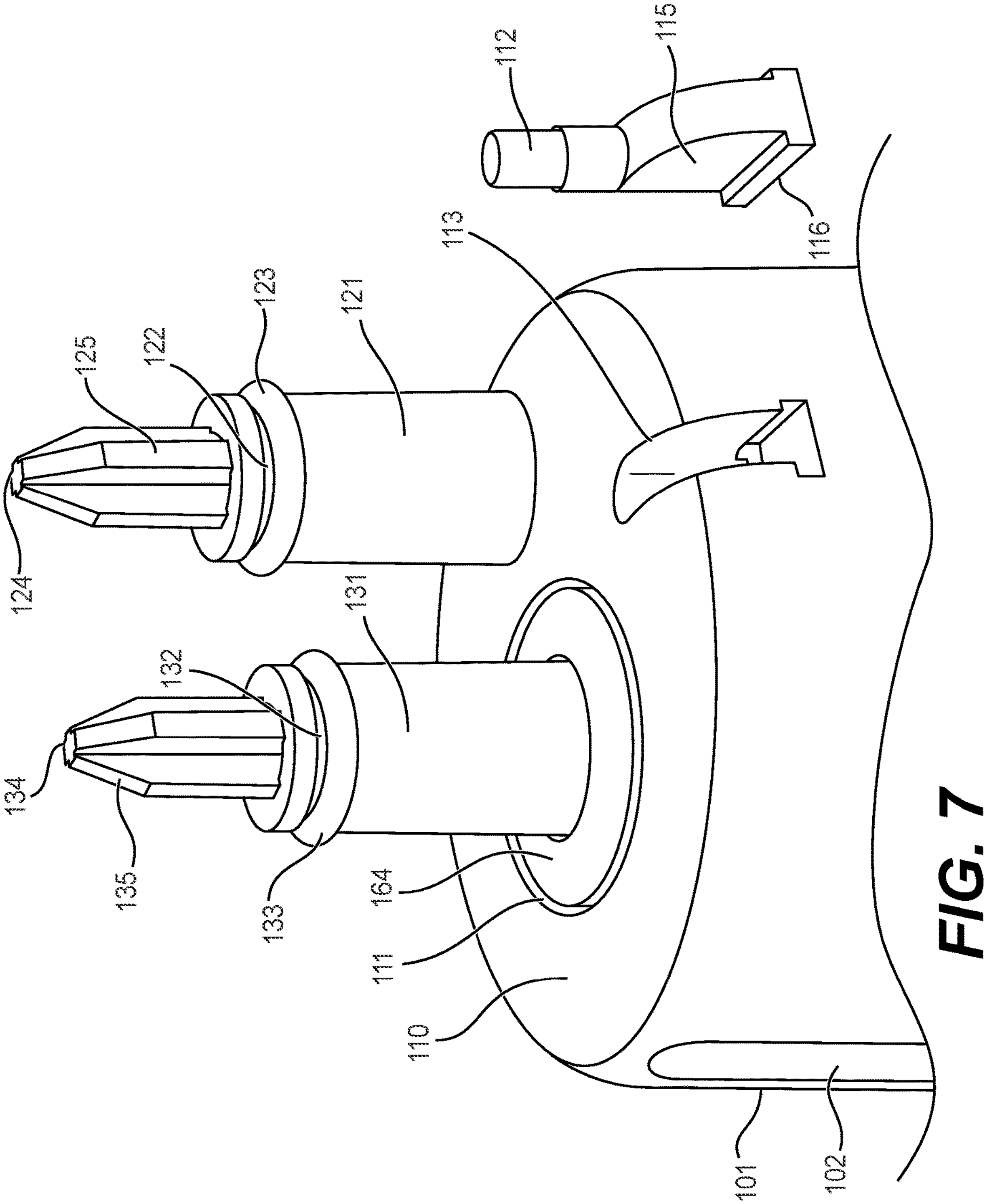
FIG. 7 is a section view of an attachment end and stepped locating block.

Contrasting FIGS. 3A & 3B, it can be seen that additional design choices can be selected and interchanged within the teachings herein. Diversion shoulder 272 can abut core shoulder 161 directly, even having a press or slip fit. Or diversion shoulder 172 can include a diversion gland 173 for seating a diversion seal 174. Diversion seal 174 can abut the core shoulder 161.

An additional interchangeable option when comparing FIGS. 3A & 3B, outlet neck 164 can include one or more neck glands 165 for receiving one or more neck seals 166. A pair of neck glands 165 and a pair of neck seals 166 are illustrated examples. The one or more neck seal 166 can seal against core abutment 117. Or, the outlet neck 264 can be compressed and seal directly against core abutment 217. A fixative could optionally be placed between outlet neck 264 and core abutment 217. Or, a stair-step shape can be included in core abutment 217 so that the core cutout 211 surrounds either outlet neck 264 or outlet shaft 231. Thus, it can be said that the core assembly 150, that can be interchanged with core assembly 250, comprises a core cover 160 comprising the outlet boss 130 and one or a pair of neck seals 166 between the core cover 160 and the core cutout 111. Also, optionally, a diversion cover 170 is seated with a diversion seal 174 to the core cover 160. Core assembly 150, 250 can comprise a filter core 180, 280 secured between the diversion cover 170, 270 and the bottom cover 190, 290 and with the core cover 160, 260 assembled on the diversion cover 170, 270.

Inlet boss 120, 220 and outlet boss 130, 230 are illustrated with similar constructions. Inlet shaft 121, 221 can include an inlet cavity 118, 218 while outlet shaft 131, 231 can include an outlet port 167, 267. The inlet shaft 121, 221 can include an inlet gland 122, 222 with an inlet seal 123, 223 seated therein. Outlet shaft 131, 231 can include an outlet gland 132, 232 with an outlet seal 133, 233 seated therein. Coupling features can be included to facilitate flow of unfiltered water into the water filter cartridge 100, 200 and flow of filtered water out. Numerous options exist, but the working examples herein comprise an inlet tip 124, 224 comprising cross-configured inlet teeth 125, 225 and an outlet tip 134, 234 comprising cross-configured outlet teeth 135, 235. The inlet boss 120, 220 and outlet boss 130, 230 can comprise other coupling features, preferably nipples, configured for mounting to a receptacle of an end device. Thus, it can be said that the water filter cartridge 100, 200 comprises an inlet seal 123, 223 on the inlet boss 120, 220 and an outlet seal 133, 233 on the outlet boss 130, 230. The inlet boss 120, 220 can be said to comprise an inlet tip 124, 224 projecting outward, and the inlet tip 124, 224 comprises inlet teeth 125, 225 configured to form a cross structure on the inlet boss 120, 220. The Figures provide alternative designs for the coupling features and additional alternative ornamentations for the water filter cartridges can be seen in the incorporated priority applications.

Additional options for configuring the core assembly 150, 250 comprises including a stepped core cover 160, 260 comprising a first boss configured to receive a diversion cover 170, 270, the first boss configured by arranging a core shoulder 161, 261 to extend from an outlet plate 163, 263. A second boss can be configured as the outlet neck 164, 264 and can comprise an outlet cavity 162, 262. The outlet boss 130, 230 can comprise an outlet port 167, 267, and an outlet tip 134, 234 comprising outlet teeth 135, 235. As other options, the core covers 160, 260 could be configured in a pyramidal or trapezoidal configuration.

Further, it can be said that the diversion cover 170, 270 comprises a diversion chute 175, 275 for fluidly communicating with the outlet cavity 162, 262. The diversion plate 171, 271 can be configured as a tray for positioning a first end, also called an outlet end 184, 284, of a filter core 180, 280. A bottom cover 190, 290 can comprise a bottom chute 193, 293 and a bottom plate 191, 291 can optionally or alternatively be configured with at least one rib, also called a bottom ridge 196. While a direct fixing of the bottom end 285 to the bottom plate 291 can be achieved, it is also possible to apply a fixative to fix a second end the filter core 180, also called bottom end 185, to the bottom ridge 196. As options, fixatives can be applied to various locations. Fixative such as a first paste can be used for anchoring the (second) bottom end 185 to the bottom ridge 196 (rib) and a second paste can be used for anchoring the (first) outlet end 184, 284 to the diversion plate 171, 271. As options, fixative such as paste can be applied between the diversion chute 175, 275 and the filter core 180, 280.

The alternative disclosed water filter cartridges 100, 200 overcome disadvantages in the art by providing alignment features selected among locating lugs 112, 212 and various positioning features. The ornamentation of the alignment features can vary. The locating lugs 112, 212 can be integrally formed with the attachment end 110, 220 as by extrusion molding, casting, or other options. Or, to allow the same main body 101, 201 to be a reusable or stock part for various installations, the locating lug 112, 212 can be formed as an insert. Then, the attachment end 110, 220 can comprise a stepped groove 113, 213. The locating lug 112, 212 can be configured as part of a stepped locating block 114 that is embedded in the stepped groove 113, 213. A block body 115 can be configured with a flange 116 and the locating lug 112 projecting from the stepped locating block 114. A lock-and-key type arrangement can be used for the locating lugs 112, 212 and stepped grooves 113, 213.

Examples for the various positioning features are illustrated and deviations in shape can be had as matters of design choice for the given installation of the water filter cartridge 100, 200. For example, while the first front pair of positioning features 103 are L-shaped and positioned to touch and form a "U" shape, the alternative first front pair of positioning features 203 are L-shaped, but are spaced to have a gap in the "U" shape therebetween. Each example of the first front pair of positioning features 103, 203 have differing degrees of thickness and bevel thereby showing some flexibility in the design choice. Likewise, the second front pair of positioning features 1031, 2031 differ in their placement relative to the first front pair of positioning features 103, 203 and relative to their size and shape. For example, one set of second front pair of positioning features 1031 are configured as ramped guide blocks. Another example of how to characterize the second front pair of positioning features 1031, 2031 are to say that they have rectangular footprints on the main body 109, 209 and thus are configured as rectangular guide blocks. Yet another way of characterizing the second front pair of positioning features 2031 to say they are configured as grooved guide blocks or configured as a combination of grooved and ramped guide blocks. The second front pair of positioning features 2031 can project as hook arms, angled tabs, or J-shaped brackets. The rear set of positioning features 1032, 2032 can likewise be characterized as having rectangular footprints on the main body 109, 209 and thus are configured as rectangular guide blocks. Or, rear set of positioning features 1032 can be said to resemble rectangular projections, or rear set of positioning features 2032 can be said to resemble triangular projections. The triangular projections can be said to be right angle triangles with facing parallel legs.

Alternatively, a water filter cartridge 100 comprises a main body 101 comprising a centered major axis A, an attachment end 110, an outer surface 109, and a cap end 105. The attachment end 110 comprises an inlet boss 120 offset from the centered major axis A, a locating lug 112 offset from the centered major axis A, and a core cutout 111 offset from the centered major axis A. The outer surface 109 comprises a first front pair of positioning features 103 configured as L-shaped flanges and aligned radially about the centered major axis A. A second front pair of positioning features 1031 are configured as guide blocks and are axially aligned with the first front pair of positioning features 103. A core assembly 150 is inserted through the main body 101. The core assembly 150 comprises a filter core 180 configured to direct filtered water towards an outlet boss 130, and the outlet boss 130 is positioned to protrude away from the core cutout 111. An end cap 140 is connected to the cap end 105. The end cap 140 comprises a third front positioning feature 145 configured as a singular L-shaped flange. The third front positioning feature 145 is axially aligned with the second pair of front positioning features 103, 203.

It can be said that a portion of the third front positioning feature 145 is at right angles with the second pair of front positioning features 1031. This can be seen in FIG. 1A by comparison to plane P along Axis A. The end cap 140 comprises a (third front) positioning feature 145 configured as an L-shaped flange, and the plane P passes perpendicularly through a portion of the L-shaped flange. The plane P is shown perpendicular to a portion of the L-shaped third front positioning feature 145. Although a perpendicular relationship is illustrated, additional angles for the intersection of the plane P with a portion of the L-shaped third front positioning feature 145 can be used, including acute or obtuse angles for orienting the intersected portion of the L-shaped third front positioning feature 145.

Figure 1B:
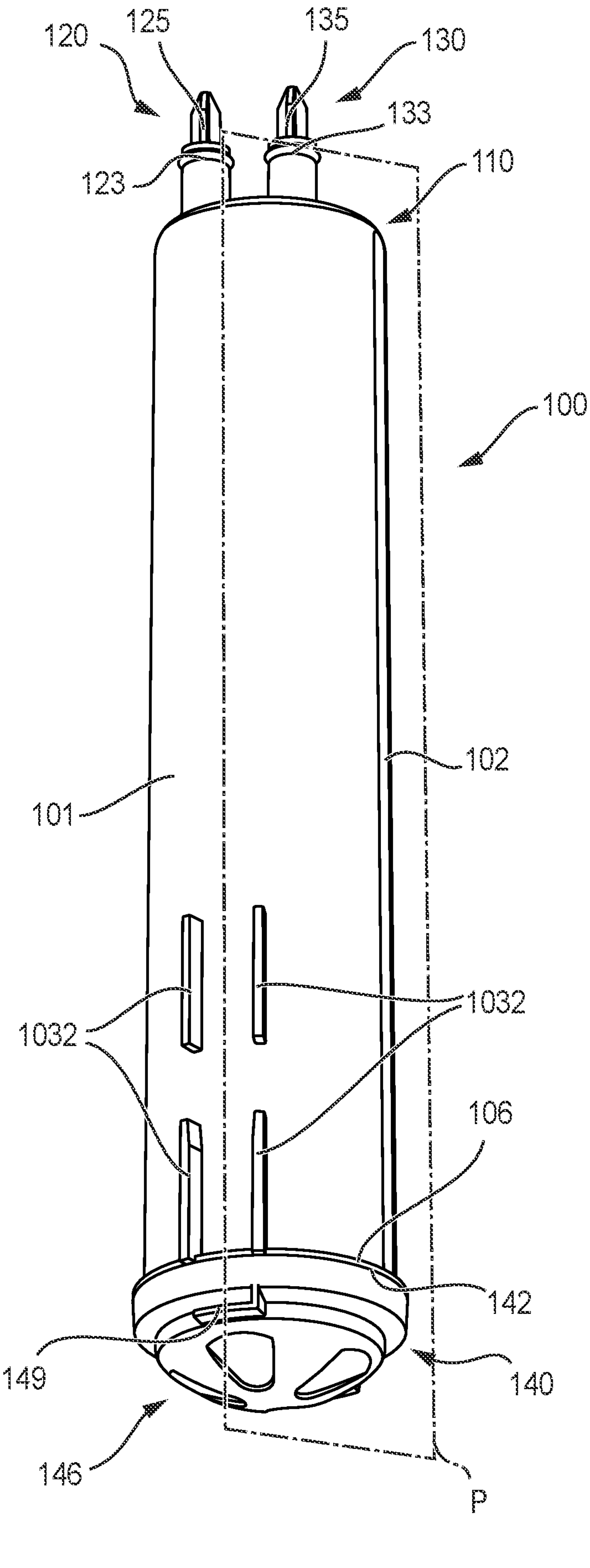

The comparison of FIG. 1A, together with FIG. 1B, shows that the water filter cartridge 100 can comprise at least one rear set, and as illustrated two rear sets, of positioning features 1032 aligned radially about the centered major axis A to extend on the main body 109. The end cap 140 can comprises a rear positioning feature 149 configured as an L-shaped flange. The rear positioning feature is aligned to form a perpendicular angle relative to the rear set of positioning features 1032.

Extending the comparison further, the plane P bisecting the main body 109 and including the centered major axis A also passes between each of the first front pair of positioning features 103, the second front pair of positioning features 1031 and the rear set of positioning features 1032. The plane P can also intersect one or both of the third front positioning feature 145 and the rear positioning feature 149. It could be said that the plane P bisects the water filter cartridge 100 to form mirror image halves of the main body 101 while forming non-mirror image halves of the end cap 140. The plane P bisects the water filter cartridge 100 so that the several positioning features (103, 1031, 1032) form mirror images on main body 101, while the positioning features (145, 149) of the end cap 140 are not in mirror image to one another.

Figure 2A:
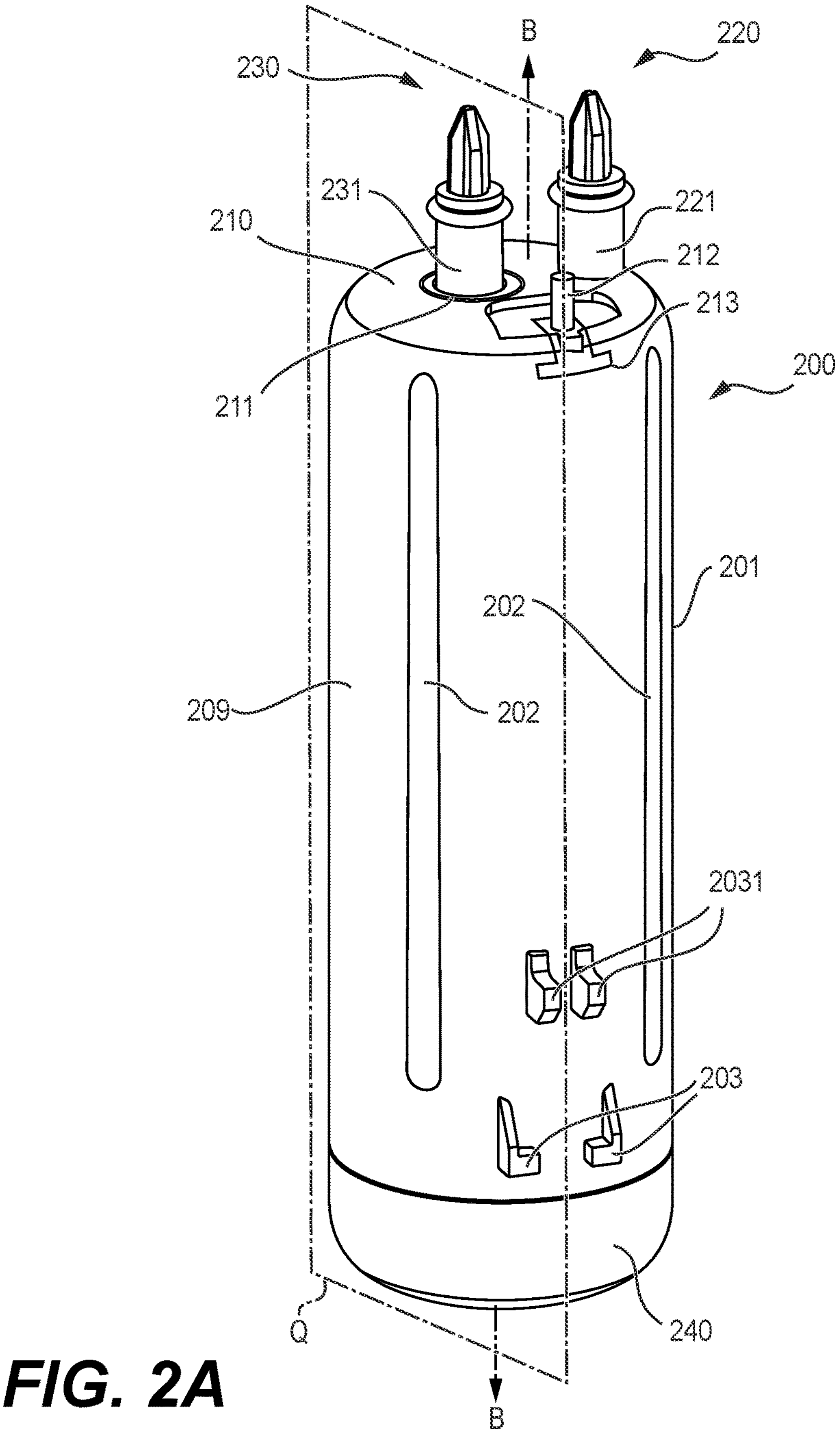
FIGS. 2A & 2B are perspective exterior views of a second example dual-ended water filter cartridge.
Figure 2B:
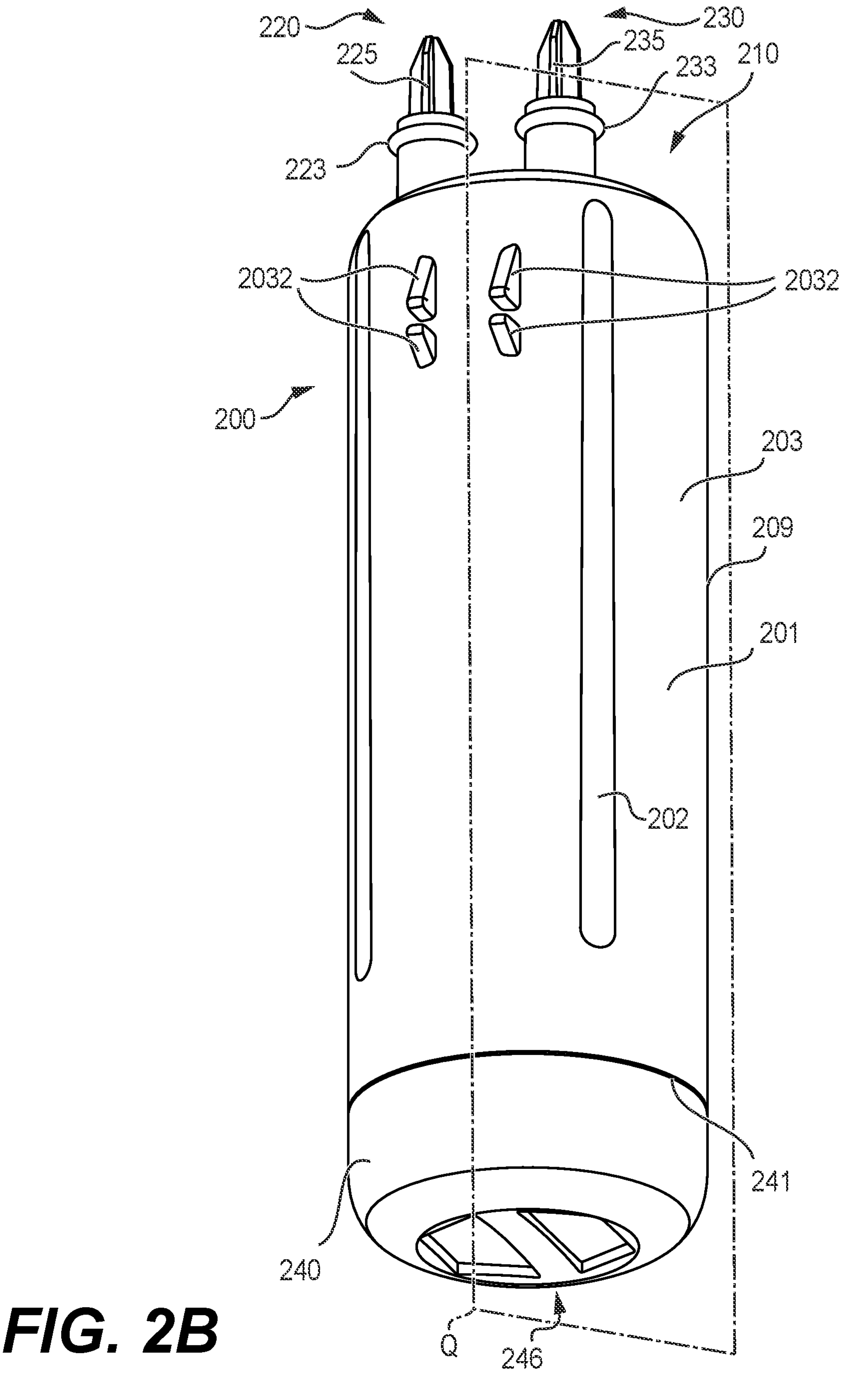

A comparison of FIGS. 2A & 2B, shows that the water filter cartridge 200 can comprise at least one rear set, and as illustrated two rear sets, of positioning features 2032 aligned radially about the centered major axis A to extend on the main body 209. The end cap 240 can comprise no additional exterior positioning features. The plane Q bisecting the main body 209 and including the centered major axis B passes between each of the first front pair of positioning features 203, the second front pair of positioning features 2031 and the rear set of positioning features 2032. It could be said that the plane Q bisects the water filter cartridge 200 to form mirror image halves of the main body 201. Mirror-image or non-mirror image halves of the end cap 240 can be formed based on the orientation of the embossed end 246. The plane Q bisects the water filter cartridge 200 so that the several positioning features (203, 2031, 2032) form mirror images on main body 201, while the end cap 240 is optionally bisected in mirror image halves.

The water filter cartridge 100, 200 comprising separate axial locations for the inlet boss 120, 220 and the outlet boss 130, 230. The inlet boss 120, 220 and the outlet boss 130, 230 are connected to corresponding outer cavity 10, 11 & inner cavity 20, 21 inside the water filter cartridge 100, 200 to avoid cross-contamination of pre-filtered water and filtered water. It is possible to locate the inlet boss 120, 220 and the outlet boss 130, 230 so that one is centered on the filter body 101 and the other is offset to a side of the filter body 101. Since the inlet boss 120, 220 and the outlet boss 130, 230 are matched with two different connecting cavities, the unfiltered and filtered water will not be mixed due to the failure of a coaxial rubber ring. The unfiltered water enters the interior of the water filter cartridge 100, 200 from the side of the filter body 101, passes through the filter core 180 sandwiched between the diversion cover 170, 270 and bottom cover 190, 290, and flows out of a centralized outlet port 162, 262. The problem of finding the internal leakage location in the coaxial scenario is avoided and the filtration efficiency is improved.

Other implementations will be apparent to those skilled in the art from consideration of the specification and practice of the examples disclosed herein.

What is claimed is:

1. A water filter cartridge, comprising:

a main body comprising a major axis, a plane bisecting the main body and including the major axis, an attachment end, an outer surface, and a cap end, the attachment end comprising an inlet boss, a locating lug, and a core cutout, and the outer surface comprising:

a first front pair of positioning features configured as L-shaped flanges and aligned radially about the major axis; and a second front pair of positioning features configured as guide blocks aligned radially about the major axis, wherein the plane passes between the first front pair of positioning features and the second front pair of positioning features;

a core assembly inserted through the main body, the core assembly comprising:

a filter core configured to direct filtered water towards an outlet boss, and the outlet boss is positioned to protrude away from the core cutout; and an end cap connected to the cap end.

2. The water filter cartridge of claim 1, wherein the second front pair of positioning features are configured as rectangular guide blocks.

3. The water filter cartridge of claim 1, wherein the second front pair of positioning features are configured as grooved guide blocks or ramped guide blocks.

4. The water filter cartridge of claim 1, wherein the end cap further comprises a front positioning feature configured as an L-shaped flange, and the plane passes perpendicularly through a portion of the L-shaped flange.

5. The water filter cartridge of claim 1, further comprising a stepped groove in the attachment end, wherein the locating lug is configured as part of a stepped locating block that is embedded in the stepped groove.

6. The water filter cartridge of claim 1, wherein the core assembly comprises a core cover comprising the outlet boss and one or a pair of neck seals between the core cover and the core cutout, a diversion cover seated with a diversion seal to the core cover, a bottom cover, and a filter core secured between the diversion cover and the bottom cover.

7. The water filter cartridge of claim 1, wherein the core assembly comprises a stepped core cover comprising: a first boss configured to receive a diversion cover, a second boss configured as an outlet neck and comprising outlet cavity, the outlet boss comprising an outlet port, and an outlet tip comprising outlet teeth.

8. The water filter cartridge of claim 7, wherein the diversion cover comprises a diversion chute for fluidly communicating with the outlet cavity and a diversion plate configured as a tray for positioning a first end of a filter core.

9. The water filter cartridge of claim 8, further comprising a bottom cover comprising a bottom chute and a bottom plate with at least one rib, wherein a second end the filter core is connected to the rib.

10. The water filter cartridge of claim 9, comprising first paste anchoring the second end to the rib and second paste anchoring the first end to the diversion plate.

11. The water filter cartridge of claim 8, further comprising paste between the diversion chute and the filter core.

12. The water filter cartridge of claim 1, further comprising an inlet seal on the inlet boss and an outlet seal on the outlet boss.

13. The water filter cartridge of claim 1, wherein the inlet boss comprises an inlet tip projecting outward, and the inlet tip comprises inlet teeth configured to form a cross structure on the inlet boss.

14. A water filter cartridge, comprising:

a main body comprising a centered major axis, an attachment end, an outer surface, and a cap end, the attachment end comprising an inlet boss offset from the centered major axis, a locating lug offset from the centered major axis, and a core cutout offset from the centered major axis, and the outer surface comprising:

a first front pair of positioning features configured as L-shaped flanges and aligned radially about the centered major axis; and a second front pair of positioning features configured as guide blocks and axially-aligned with the first front pair of positioning features;

a core assembly inserted through the main body, the core assembly comprising: a filter core configured to direct filtered water towards an outlet boss, and the outlet boss is positioned to protrude away from the core cutout; and an end cap connected to the cap end, the end cap comprising a third front positioning feature configured as an L-shaped flange, the third front positioning feature axially-aligned with the second front pair of positioning features.

15. The water filter cartridge of claim 14, wherein a portion of the third front positioning feature forms perpendicular angles with the second front pair of positioning features.

16. The water filter cartridge of claim 14, further comprising a rear set of positioning features aligned radially about the centered major axis to extend on the main body, and wherein the end cap further comprises a rear positioning feature configured as an L-shaped flange, wherein the rear positioning feature is aligned to form a perpendicular angle relative to the rear set of positioning features.

17. The water filter cartridge of claim 14, wherein a plane bisecting the main body and including the centered major axis also passes between each of the first front pair of positioning features, the second front pair of positioning features and the rear set of positioning features.

18. A dual-ended cartridge, comprising:

a main body comprising a centered major axis, an attachment end, an outer surface, and a cap end, wherein the attachment end comprises:

an inlet boss offset from the centered major axis, a locating lug offset from the centered major axis, and a core cutout offset from the centered major axis, and wherein the outer surface comprises:

a first front pair of positioning features configured as L-shaped flanges, and a second front pair of positioning features configured as guide blocks and axially aligned with the first front pair of positioning features, and a core assembly inserted through the main body, the core assembly comprising:

an outlet boss; and a filter core configured to guide filtered water to the outlet boss; and an end cap attached to the cap end.

* * * * *